United States Patent
Sugimura et al.

(10) Patent No.: US 7,177,005 B2
(45) Date of Patent: Feb. 13, 2007

(54) LIQUID CRYSTAL DISPLAY DEVICE MANUFACTURING METHOD AND LIQUID CRYSTAL DISPLAY DEVICE MANUFACTURING SYSTEM

(75) Inventors: Hiroyuki Sugimura, Kawasaki (JP); Taiji Yuhara, Yonago (JP); Satoshi Murata, Kawasaki (JP); Norimichi Nakayama, Kawasaki (JP); Hiroyasu Inoue, Kawasaki (JP)

(73) Assignee: Sharp Kabushiki Kaisha, Osaka (JP)

(*) Notice: Subject to any disclaimer, the term of this patent is extended or adjusted under 35 U.S.C. 154(b) by 236 days.

(21) Appl. No.: 09/891,694

(22) Filed: Jun. 26, 2001

(65) Prior Publication Data
US 2002/0080321 A1   Jun. 27, 2002

(30) Foreign Application Priority Data
Oct. 31, 2000   (JP)   ............ 2000-333642

(51) Int. Cl.
*G02F 1/1341* (2006.01)
*G02F 1/1339* (2006.01)

(52) U.S. Cl. ............ 349/189; 349/149; 349/153; 349/190

(58) Field of Classification Search ............ 349/189, 349/190, 153
See application file for complete search history.

(56) References Cited

U.S. PATENT DOCUMENTS

| | | | | |
|---|---|---|---|---|
| 5,277,333 A | * | 1/1994 | Shimano | 222/14 |
| 6,051,175 A | * | 4/2000 | Kurihara et al. | 264/210.8 |
| 6,231,917 B1 | * | 5/2001 | Ito et al. | 427/9 |
| 6,322,735 B1 | * | 11/2001 | Yamaki et al. | 249/69 |
| 6,575,564 B1 | * | 6/2003 | Tsuchiya et al. | 347/70 |

FOREIGN PATENT DOCUMENTS

| | | |
|---|---|---|
| JP | 6-51256 | 2/1994 |
| JP | 07128674 | * 5/1995 |
| JP | 11-337957 | 12/1999 |

* cited by examiner

*Primary Examiner*—David Nelms
*Assistant Examiner*—Hoan Nguyen
(74) *Attorney, Agent, or Firm*—Greer, Burns & Crain, Ltd

(57) ABSTRACT

There is provided a liquid crystal display device manufacturing method that comprises the steps of forming a sealing member along a periphery of a display area on a first surface of a first substrate, dropping a liquid crystal to the first surface of the first substrate from a top end of a liquid crystal supply needle provided to a lower end of a syringe in which the liquid crystal is filled, and dropping down the liquid crystal adhered to a surface of the liquid crystal supply needle onto the first substrate by an external force in a middle of dropping of the liquid crystal or after the liquid crystal is dropped. Accordingly, an amount of liquid crystal supplied to the substrate can be controlled with high precision.

3 Claims, 8 Drawing Sheets

FIG. 1A (Prior Art)
FIG. 1B (Prior Art)
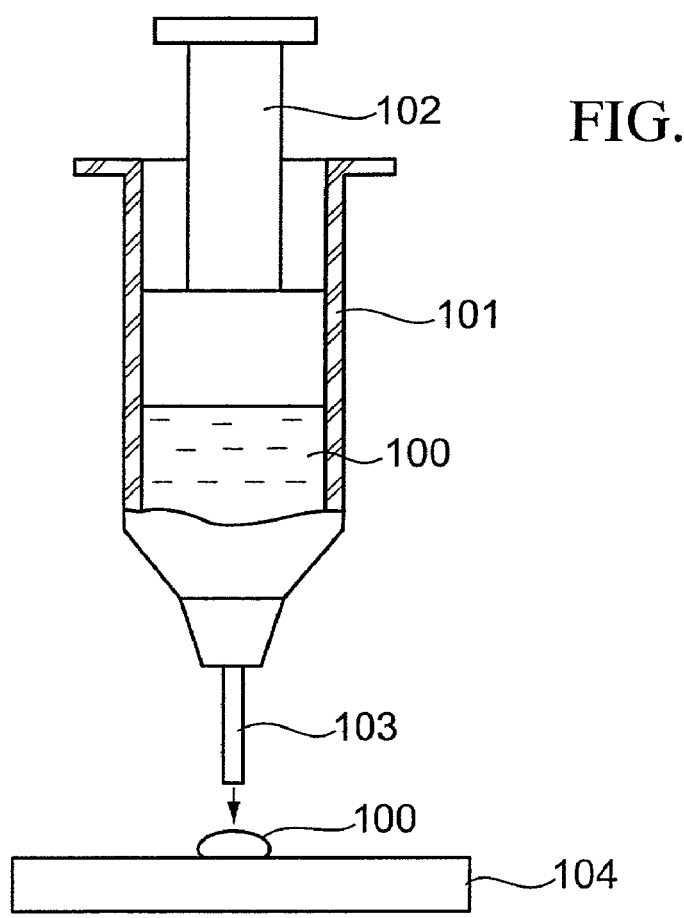
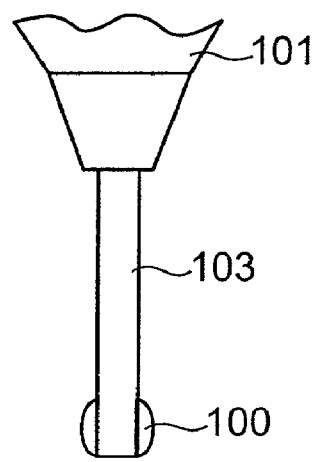

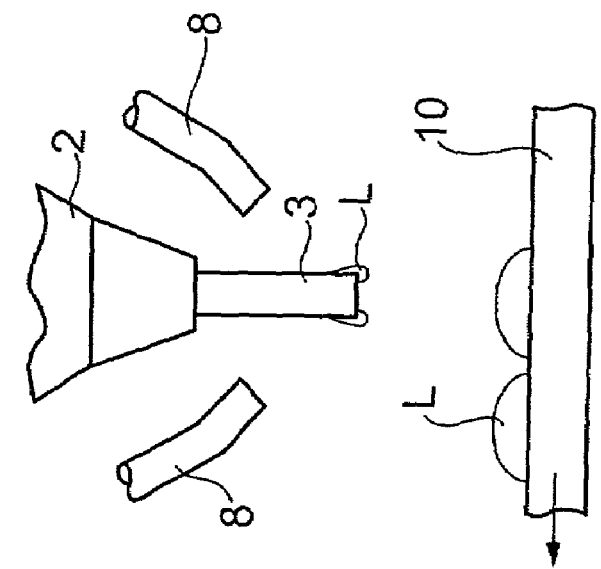
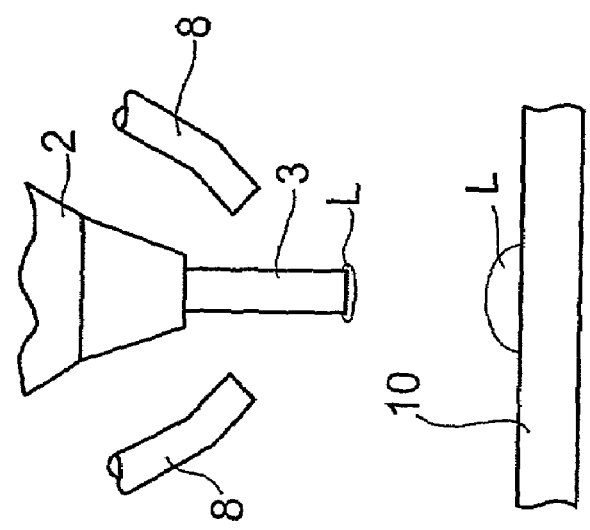
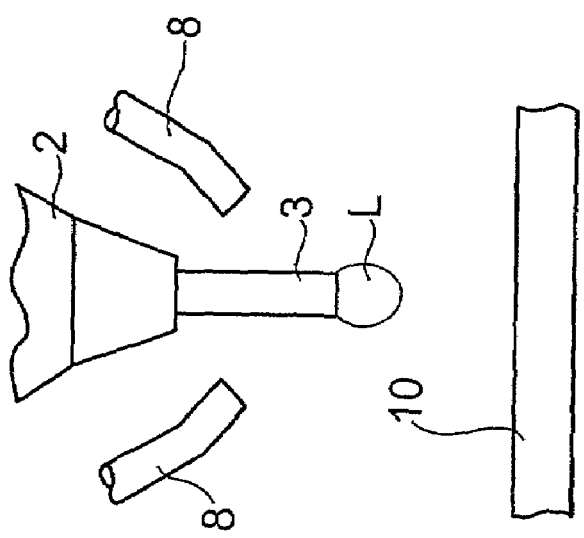

AIR PRESSURE

LIQUID CRYSTAL DISPLAY DEVICE MANUFACTURING METHOD AND LIQUID CRYSTAL DISPLAY DEVICE MANUFACTURING SYSTEM

BACKGROUND OF THE INVENTION

1. Field of the Invention

The present invention relates to a liquid crystal display device manufacturing method and a liquid crystal display device manufacturing system and, more particularly, a liquid crystal display device manufacturing method having the step of dropping a liquid crystal into a substrate from a syringe and a system used to manufacture the liquid crystal display device.

2. Description of the Prior Art

The liquid crystal display device has a structure that the TFT substrate on which the pixel electrodes, the thin film transistors (TFTs), etc. are formed and the opposed substrate on which the opposed electrode, the color filters, etc. are formed are stuck together, and the liquid crystal sealed between the TFT substrate and the opposed substrate.

As the method of sealing the liquid crystal between the TFT substrate and the opposed substrate, the vacuum injection method, the drop method, etc. are employed.

According to the vacuum injection method, an empty cell is formed by sticking two substrates to put a frame-like sealing member having a liquid crystal introducing port between them, then a space between the substrates is decompressed vacuous via the liquid crystal introducing port, and then the liquid crystal is introduced between the substrates by utilizing difference in the atmospheric pressure between the inside and the outside of the empty cell. According to the drop method, the liquid crystal is dropped down into the area of the TFT substrate, in which the sealing member is coated like the frame, and then the cell is formed by sticking the TFT substrate and the opposed substrate in the vacuum atmosphere.

In contrast to the vacuum injection method, the drop method has the merit such that no time is required to seal the liquid crystal introducing port of the frame-like sealing member and to clean the peripheral area of the liquid crystal introducing port. As the liquid crystal supply syringe employed in the drop method, there are the air system, the tubing system, the plunger system, etc., for example. Any one of these systems may be employed to drop the low-viscosity fluid such as the liquid crystal.

If the low-viscosity fluid is discharged minutely with high precision, normally the plunger system may be employed. In the plunger system, there are the capacity measuring type, the motor driving type, etc.

The syringe used in the plunger system has the structure shown in FIG. 1A. The operation for moving the plunger 102 in the syringe 101 in which the liquid crystal is filled is performed to drop the liquid crystal from the needle 103 provided to the lower end of the syringe 101 toward the substrate 104.

By the way, in the liquid crystal display device, in order to get the proper display, there exists the demand to seal an amount of liquid crystal with high precision.

However, if the minute liquid crystal 100 is discharged from the needle 103, in some cases the liquid crystal 100 adheres to the top of the needle 103, as shown in FIG. 1B, when the liquid crystal 100 is discharged or after the liquid crystal 100 is discharged.

If the adhered liquid crystal remains at the top of the needle, the precision in supplying the liquid crystal to the cell is lowered and thus the trouble occurs on the display.

Vacuum bubbles are mixed in the cell if a volume of the liquid crystal is reduced rather than the target volume, whereas the unusual cell thickness is brought about if a volume of the liquid crystal is increased rather than the target volume. If a supply amount of the liquid crystal to the liquid crystal display cell is reduced rather than the target volume, portions containing no liquid crystal appear as lines on the image. In contrast, if an amount of the liquid crystal is increased rather than the target volume, the liquid crystal display cell becomes inflated partially to cause the degradation of the image display. As the case where the liquid crystal is increased much more than the target volume, for example, there is the case that, when the supply of the liquid crystal to the n-th substrate (n; natural number) is finished, the liquid crystal adhered to the needle drops down onto the (n+1)-th substrate.

If the dropping speed of the liquid crystal from the equipment shown in FIG. 1A is increased, such adhesion of the liquid crystal onto the top of the needle can be eliminated. In this case, there is such a disadvantage that the discharge precision of the liquid crystal is lowered under such condition.

SUMMARY OF THE INVENTION

It is an object of the present invention to provide a liquid crystal display device manufacturing method and a liquid crystal display device manufacturing system capable of supplying an amount of the liquid crystal to a substrate with high precision.

The above subject can be overcome by supplying the liquid crystal from the liquid crystal supply needle onto the substrate and then causing the liquid crystal adhered to the surface of the liquid crystal supply needle to drop down by the external force. As the external force, there are the blowing-off of the gas to the liquid crystal supply needle, the electrostatic force generated by charging the substrate, etc. If the liquid crystal adhered to the surface of the liquid crystal supply needle is blown away, such a structure may be employed that the air supplying means for blowing the gas against the adhered liquid crystal are arranged around the liquid crystal supply needle.

Accordingly, because the liquid crystal adhered to the liquid crystal supply needle is dropped by the external force to supply onto the substrate, such liquid crystal can be supplied onto the substrate by a high precision amount and thus the display of the liquid crystal display device becomes excellent.

Also, the above subject can be overcome by replenishing the liquid crystal into the syringe from the outside by the same defined amount as the liquid crystal dropped from the syringe such that the pushing force of the liquid crystal to the liquid crystal supply needle can be maintained constant and that the liquid crystal can be dropped from the liquid crystal supply needle at the speed not to left the liquid crystal on the surface of the liquid crystal supply needle of the syringe.

Accordingly, the liquid crystal is not left on the surface of the liquid crystal supply needle, and also the variation of the drop conditions of the liquid crystal can be suppressed because the drop of the liquid crystal by the same amount in the syringe can be started. As a result, the error of the liquid crystal amount in the liquid crystal display device can be reduced, and also the defective display of the liquid crystal display device can be reduced.

BRIEF DESCRIPTION OF THE DRAWINGS

FIG. 1A is a side view showing a liquid crystal supplying equipment in the prior art, and FIG. 1B is a side view showing a liquid supply needle after the liquid crystal is discharged from the liquid crystal supplying equipment;

FIGS. 4A to 4F are views showing steps for supplying the liquid crystal to the substrate from the liquid crystal supplying equipment shown in FIG. 2 respectively;

DESCRIPTION OF THE PREFERRED EMBODIMENTS (First Embodiment)

Figure 2:
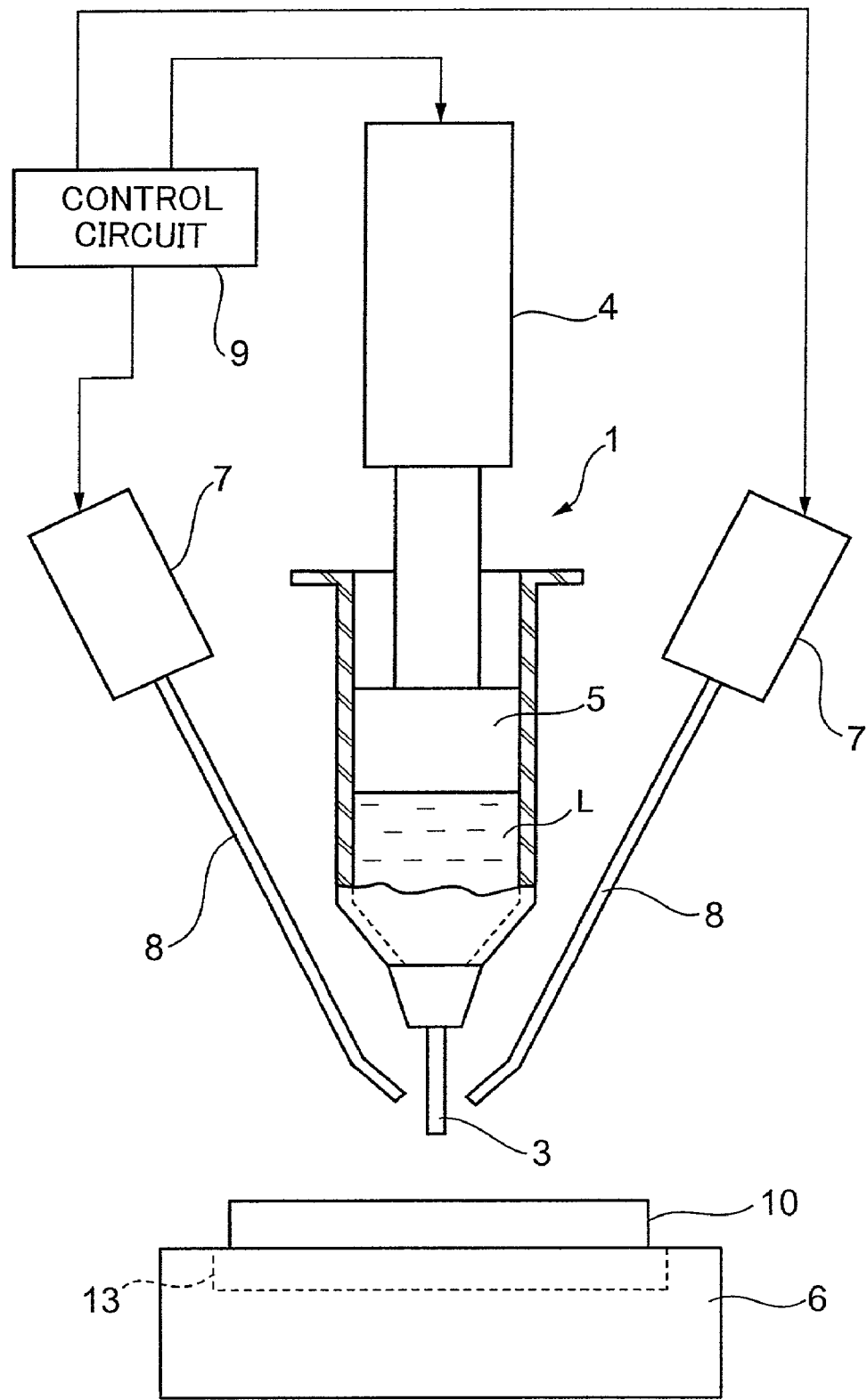
FIG. 2 is a view showing a liquid crystal supplying equipment employed to manufacture a liquid crystal display device according to a first embodiment of the present invention.

FIG. 2 is a view showing a configuration of a liquid crystal supplying equipment employed to manufacture a liquid crystal display device according to a first embodiment of the present invention.

In FIG. 2, a hollow liquid crystal supply needle 3 is provided to the bottom end of a liquid crystal supply syringe 1 to drop down the liquid crystal L in the syringe 1 on a first substrate 10. A plunger 5 that is connected to a driving source 4 is inserted into the inside of the syringe 1, and the liquid crystal L is pushed out from the top end of the liquid crystal supply needle 3 by descending the plunger 5. The plunger 5 is mechanically moved vertically by the driving source 4.

A loading table 6 on which the first substrate 10 is loaded is arranged movably under the syringe 1. Also, the syringe 1 is arranged at a height, that provides an interval of 10 to 20 mm, for example, between the loading table 6 and the liquid crystal supply needle 3, such that it can be moved laterally.

Also, air supplying means 7 each having an air supply needle 8, that blows the gas (e.g., air) against the outer peripheral surface of the liquid crystal supply needle 3 and the discharge end of that, are arranged around the liquid crystal supply needle 3 of the syringe 1. At least two air supply needles 8 are arranged around the liquid crystal supply needle 3 at a substantially equal interval. The air supply needles 8 a surface of which is coated by Teflon may be employed.

A blowing-off speed/a blowing-off timing of the gas from the air supply needles 8 by the air supplying means 7 and a dropping amount/a dropping speed of the liquid crystal L from the syringe 1 can be controlled by a control circuit 9 respectively.

For example, the digitally-controlled plunger system dispenser SMPIII (product name: manufactured by Musashi Engineering Co., Ltd.) is used as the syringe 1. For example, the air system dispenser Σ 8000 (product name: manufactured by Musashi Engineering Co., Ltd.) is used as the air supplying means 7.

Next, a method of supplying the liquid crystal to the liquid crystal display panel by using the above liquid crystal supplying equipment will be explained hereunder.

Figure 3A:
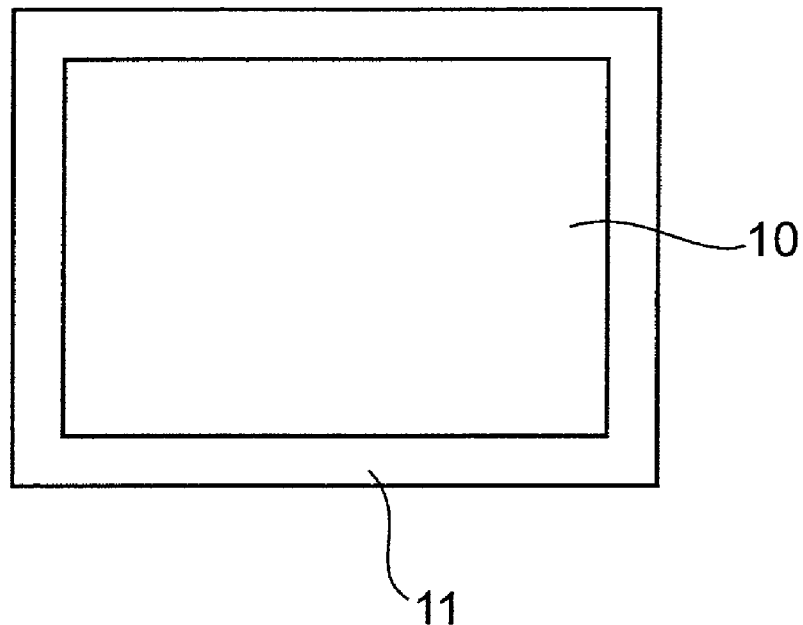
FIG. 3A is a plan view showing a first substrate, to which the liquid crystal is supplied, in the first embodiment of the present invention.

First, as shown in FIG. 3A, a first substrate (TFT substrate) 10, on which thin film transistors (TFTs), pixel electrodes, wirings, spacers, etc. are formed, is prepared. Then, ultraviolet-cured sealing member 11 is coated on a surface of the first substrate 10, on which the TFTs are formed, along a periphery of a display area. As the first substrate 10, a transparent substrate such as glass, quartz, etc., for example, is employed. If one sheet of substrate is employed for a plurality of display panels, a plurality of display areas are present on one sheet of substrate. In this case, photo-initiator which is cured by the light irradiation is contained in the sealing member 11.

Then, if the plunger 5 in the syringe 1 is dropped down sequentially at a rate of less than 2 mm/sec, for example, in the state that the first substrate 10 is loaded on the loading table 6, the liquid crystal is projected from the top end of the liquid crystal supply needle 3 like the drop, as shown in FIG. 4A. The drop becomes large gradually and finally drops down onto the first substrate 10 by own weight, as shown in FIG. 4B. Since the liquid crystal L is supplied continuously from the syringe 1 to the top end of the liquid crystal supply needle 3 in the middle of the drop of the liquid crystal L, the drop of the liquid crystal L is formed again at the top end.

In this manner, formation of the drop and dropping of the drop are repeated at the tip of the liquid crystal supply needle 3.

Figure 3B:
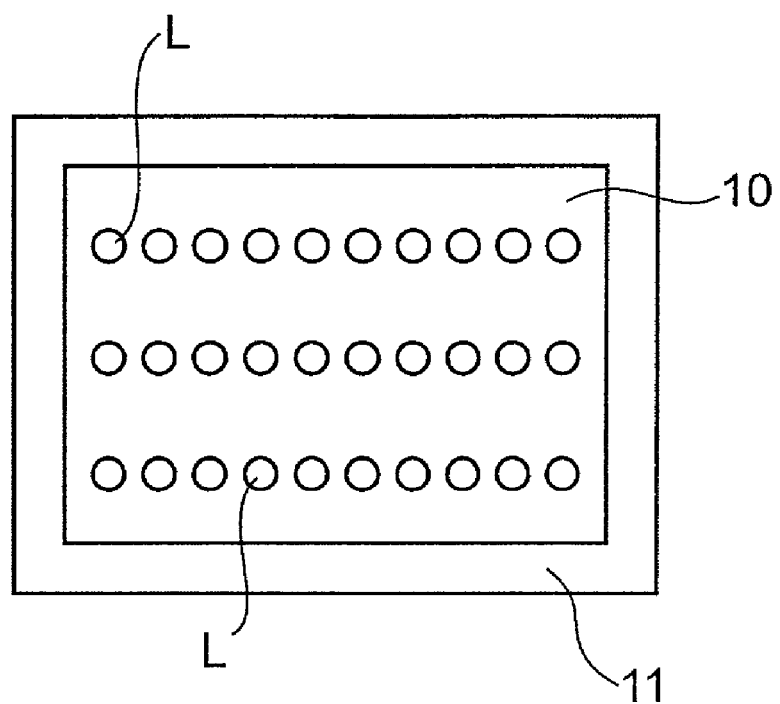
FIG. 3B is a plan view showing the state in which the liquid crystal is supplied to the first substrate.

At least one of the loading table 6 and the syringe 1 is moved to the time between the drops of the liquid crystal L to change the discharge position on the first substrate 10. Thus, an upper surface of the first substrate 10 on which the liquid crystal L is supplied to plural locations is brought into the state shown in FIG. 3B.

Then, movement of the plunger 5 is stopped at a point of time when the dropping of the liquid crystal L is finished at the discharging position of final on the first substrate 10, and thus the liquid crystal L is not fed to the liquid crystal supply needle 3 from the syringe 1. Then, as shown in FIG. 4C, sometimes the adhered liquid crystal L still remains on the surface near the top end of the liquid crystal supply needle 3.

The liquid crystal L adhered onto the surface of the liquid crystal supply needle 3 causes the situation that a total amount of the liquid crystal L on the first substrate 10 is reduced smaller than the target volume or causes the situation that a total amount of the liquid crystal L on the another first substrate 10 is increased larger than the target volume.

Figure 4D:
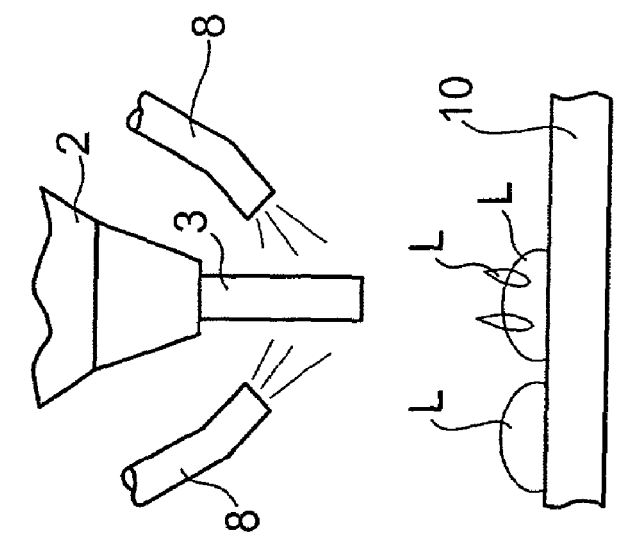
Figure 4E:
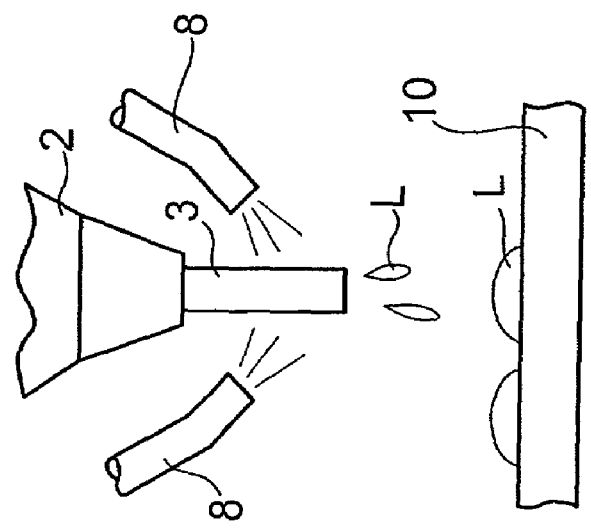
Figure 4F:
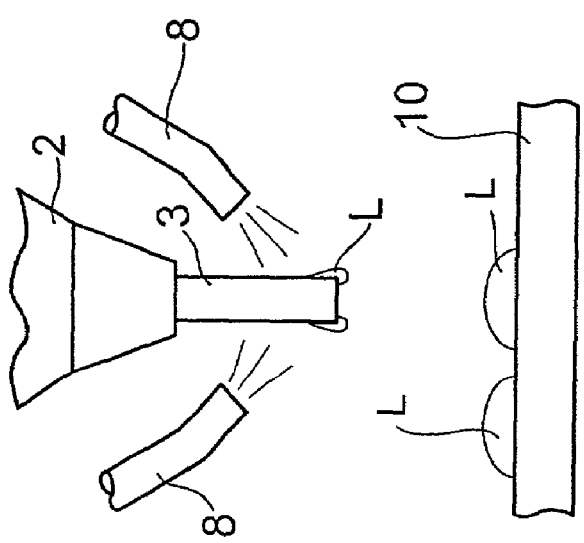

Therefore, in order to eliminate or reduce the error in the supply amount of the liquid crystal L on the first substrate 10, the liquid crystal L being left on the surface of the liquid crystal supply needle 3 is blown off forcedly from the upper oblique side toward the first substrate 10, as shown in FIGS. 4E and 4F, by blowing the air or other gas against the liquid crystal supply needle 3 from the air supply needles 8, as shown in FIG. 4D, after the plunger 5 is stopped. It is preferable that the pressure of the air being blown off from the air supply needles 8 should be set in the range of 0.5 to 2.0 kgf /cm² and that the air should be brown off for about 0.5 second. Also, the air supply needles 8 are arranged such that they are tilted by about 30 degree with respect to the liquid crystal supply needle 3.

As a result, the error between the amount of the liquid crystal L being supplied from the syringe 1 to the liquid crystal supply needle 3 and the amount of the liquid crystal L being dropped actually from the liquid crystal supply needle 3 to the first substrate 10 can be eliminated or reduced rather than the prior art.

Figure 5A:
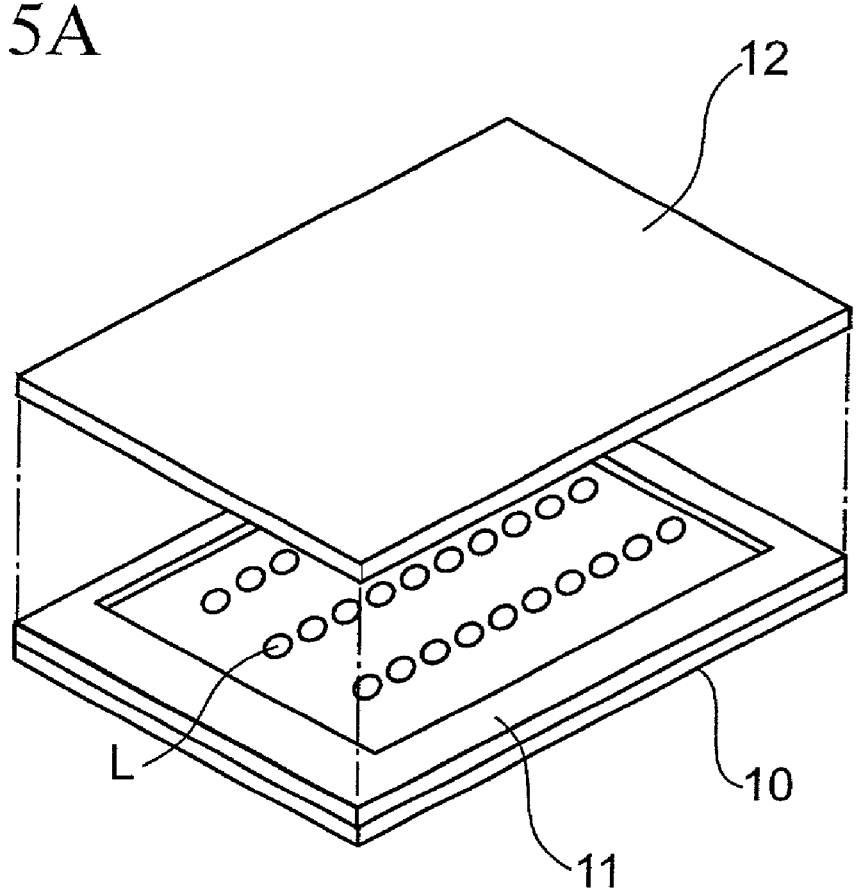
FIGS. 5A and 5B are a perspective view showing a step of sticking the substrate constituting the liquid crystal display device according to the first embodiment of the present invention respectively.
Figure 5B:
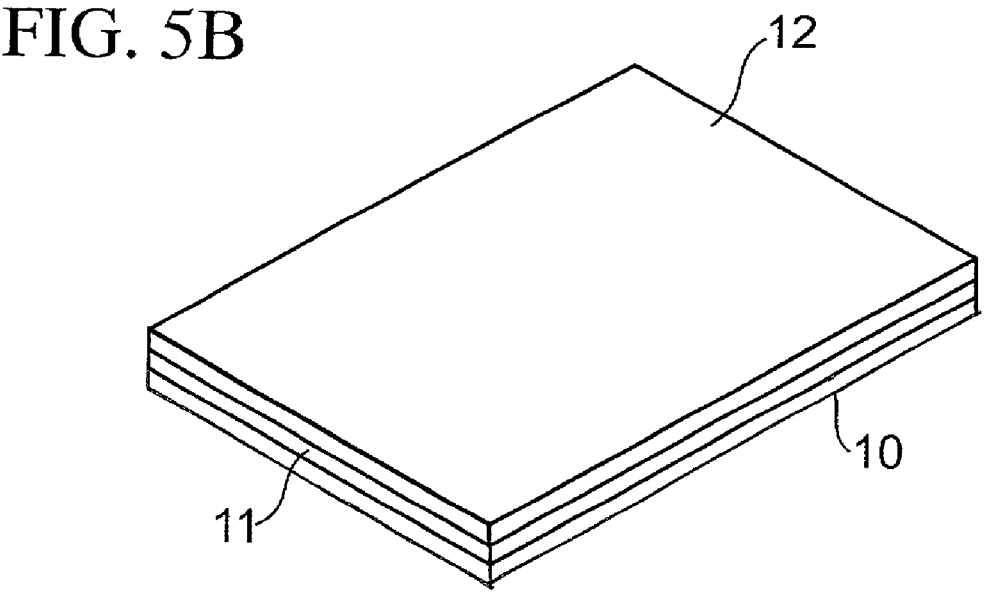

After the supply of the liquid crystal L to the first substrate 10 is finished, a second substrate (opposed substrate) 12 on which an opposed electrode, color filters, etc. are formed is prepared, as shown in FIG. 5A. Then, the first substrate 10 and the second substrate 12 are placed in the low pressure atmosphere, and then the liquid crystal display cell is formed by sticking the first substrate 10 and the second substrate 12 via the sealing member 11, as shown in FIG. 5B. The opposed electrode forming surface of the second substrate 12 is opposed to the first substrate 10. The liquid crystal LL is put between the first substrate 10 and the second substrate 12.

In addition, the sealing member 11 is cured by irradiating the ultraviolet ray and thus the first substrate 10 and the second substrate 12 are fixed together.

Then, the liquid crystal L sealed between the first substrate 10 and the second substrate 12, that are taken out from the low pressure atmosphere to the atmosphere, is uniformly expanded by the pushing force between the first substrate 10 and the second substrate 12 based on the atmosphere.

In this case, the blowing-off timing of the gas from the air supply needles 8 to the liquid crystal supply needle 3 may be started during the dropping of the liquid crystal L from the liquid crystal supply needle 3 or may be started immediately before the movement of the plunger 5 is stopped.

When the supply amount of the liquid crystal L to the first substrate 10 is examined in both cases that the liquid crystal L being left in the neighborhood of the top end of the liquid crystal supply needle 3 is blown away and is not blown away respectively, results given in Table 1 and Table 2 were obtained.

Table 1 shows a coated amount of the liquid crystal in the prior art when the liquid crystal L adhered to the liquid crystal supply needle 3 is not blown away, and Table 2 shows a coated amount of the liquid crystal according to the first embodiment of the present invention when the liquid crystal L adhered to the liquid crystal supply needle 3 is blown away.

In each sample (substrate) in Table 1 and Table 2, a stroke of the plunger 5 by the driving source 4 is decided to supply the liquid crystal of 0.100 cc respectively. In experiments Table 1 and Table 2, the liquid crystal is supplied to the sample by one shot. In this case, the specific gravity of the liquid crystal is almost 1.

TABLE 1

(no blowing off)

| Number of Sample | Coated Amount (mg) |
|---|---|
| 1 | 99.6 |
| 2 | 98.5 |
| 3 | 100.7 |
| 4 | 98.7 |
| 5 | 99.5 |
| 6 | 99.4 |

TABLE 1-continued (no blowing off)

| Number of Sample | Coated Amount (mg) |
|---|---|
| 7 | 99.2 |
| 8 | 98.8 |
| 9 | 99.5 |
| 10 | 99.6 |
| Minimum | 98.5 |
| Maximum | 100.7 |
| Average | 99.35 |
| Standard deviation(σ) | 0.620484 |
| Conditions: | Needle 27G (Teflon coating) |
| | Syringe capacity 5 cc |
| | Coated amount on the substrate 0.100 cc |
| | Number of shot 1 |

TABLE 2

(blowing off)

| Number of Sample | Coated Amount (mg) |
|---|---|
| 1 | 99.9 |
| 2 | 99.6 |
| 3 | 99.9 |
| 4 | 100.1 |
| 5 | 100.1 |
| 6 | 99.6 |
| 7 | 99.8 |
| 8 | 98.6 |
| 9 | 100.1 |
| 10 | 99.8 |
| Minimum | 99.6 |
| Maximum | 100.1 |
| Average | 99.85 |
| Standard deviation(σ) | 0.206828 |
| Conditions: | Needle 27G (Teflon coating) |
| | Syringe capacity 5 cc |
| | Coated amount on the substrate 0.100 cc |
| | Number of shot 1 |

According to Table 1, as the result of that the liquid crystal being adhered to the liquid crystal supply needle 3 is not blown away, difference between the maximum value and the minimum value of the supply amount of the liquid crystal on the sample is 2.2 mg, an average value is 99.35 mg, and a standard deviation is 0.620484 mg.

In contrast, as the result of that the liquid crystal being adhered to the liquid crystal supply needle 3 is not blown away, difference between the maximum value and the minimum value of the supply amount of the liquid crystal on the sample is 0.5 mg, an average value is 99.85 mg, and a standard deviation is 0.206828 mg. The error of the supply amount of the liquid crystal of respective samples can be extremely reduced rather than the prior art.

Meanwhile, the above liquid crystal is caused to drop down onto the first substrate 10 from the top end of the liquid crystal supply needle 3 by the own weight of the liquid crystal drop, the pushing force by the plunger 5, and the blowoff of the gas from the outside. In addition, as the force applied from the outside to drop down the liquid crystal, the first substrate 10 may be charged by a charger indicated by a reference 13 in FIG. 2 to generate the electrostatic force between the liquid crystal drops. Thus, the liquid crystal L on the surface of the liquid crystal supply needle 3 can be drawn up to the first substrate 10 by the static electricity.

The descending motion of the above plunger 5 may be set not continuously but intermittently.

(Second Embodiment)

Figure 6:
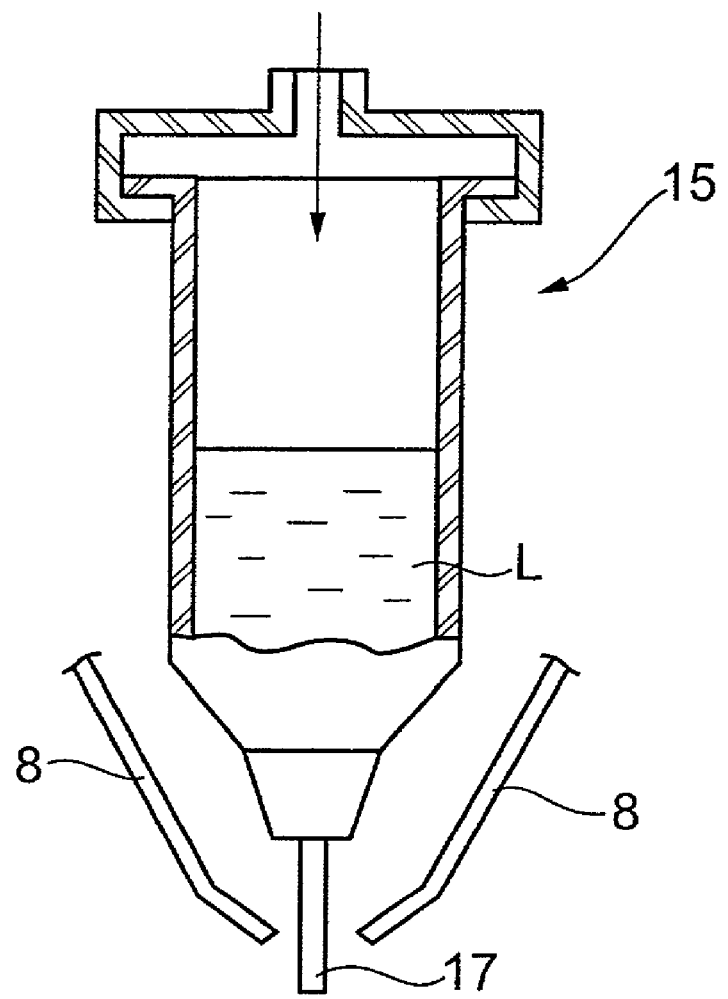
FIG. 6 is a side view showing an air system syringe employed to manufacture a liquid crystal display device according to a second embodiment of the present invention.

The plunger system syringe is employed as the liquid crystal supplying equipment shown in FIG. 2, but an air system syringe 15 shown in FIG. 6 may be employed. In the case of this air system syringe, the air supply needles 8 may also be arranged around the liquid crystal supply needle. In this air system syringe 15, the liquid crystal can be dropped down from a liquid crystal supply needle 17 provided to the top end of the syringe 15 by pressuring the liquid crystal filled in the syringe 15 from the upper side by the air pressure.

According to the air system plunger, even if the same air pressure is applied to the inside of the syringe 15, a total amount of the liquid crystal dropped onto the first substrate 10 is varied because of a residual amount of the liquid crystal in the syringe 15, as shown in Table 3. Table 3 shows the cases where an amount of the liquid crystal in the syringe 15 is set to 15 g (large), 7 g (middle), and 2.5 g (small) respectively at a point of time when the supply of the liquid crystal to the first sheet of the sample is started. In Table 3, the pure water having the same specific gravity as the liquid crystal is employed, and a target amount of the liquid crystal supply is set to 100 g by 30 shots per the coating number (one sample).

TABLE 3

| | In-syringe liquid initial capacity (In-syringe initial liquid level) | | |
|---|---|---|---|
| Coating number | 12 g (large) Coating amount(mg) | 7 g (middle) Coating amount(mg) | 2.5 g (small) Coating amount(mg) |
| 1 | 93.7 | 88 | 82.2 |
| 2 | 93.3 | 87.1 | 82.2 |
| 3 | 94 | 86.8 | 82.2 |
| 4 | 93.5 | 86.6 | 82.4 |
| 5 | 92.5 | 85.9 | 81.4 |
| 6 | 92.9 | 86.1 | 82.6 |
| 7 | 92.6 | 86.8 | 82.4 |
| 8 | 92.4 | 85.8 | 82.3 |
| 9 | 92.4 | 86.8 | 82.1 |
| 10 | 92.6 | 85.6 | 81.8 |
| 11 | 92.4 | 85.7 | 82.4 |
| 12 | 92.1 | 85.5 | 82.3 |
| 13 | 92.4 | 85.2 | 82.2 |
| 14 | 92 | 85.4 | 82.3 |
| 15 | 92 | 84.9 | 82 |
| 16 | 92.1 | 85 | 82.1 |
| 17 | 92.3 | 84.5 | 81 |
| 18 | 92.7 | 84.7 | 81 |
| 19 | 92.2 | 85 | 80.6 |
| 20 | 91.3 | 84.6 | 81.6 |
| Minimum | 91.3 | 84.5 | 80.6 |
| Maximum | 94 | 88 | 82.6 |
| Average | 92.57 | 85.5 | 81.955 |
| Standard deviation($\sigma$) | 0.644082 | 0.955868 | 0.551052 |
| Conditions: | Needle 28G (metal) Dropping time of one shot 30 ms Dropping pressure 1.0 kg/cm$^2$ (Source pressure 2.5 kg/cm$^2$) Liquid Pure water Number of shot 30 | | |

Accordingly, in order to increase the precision of the supply amount of the liquid crystal, it is preferable that the plunger system syringe 1 should be employed. However, even if the air system syringe 15 is employed, the supply amount of the liquid crystal can be maintained with high precision by adjusting the air pressure. The blowing-off of the liquid crystal adhered to the liquid crystal supply needle 17 is effective to enhance further the precision of the supply amount of the liquid crystal.

In the air system syringe 15, in order to reduce the error in the supply amount of the liquid crystal L to the first substrate 10, the liquid crystal should be supplied to the first substrate 10 while keeping the liquid crystal in the syringe 15 at the same position as much as possible. Then, a system that maintains the amount of the liquid crystal in the syringe 15 constant at a point of time when the liquid crystal is supplied to respective substrates will be explained hereunder.

Figure 7A:
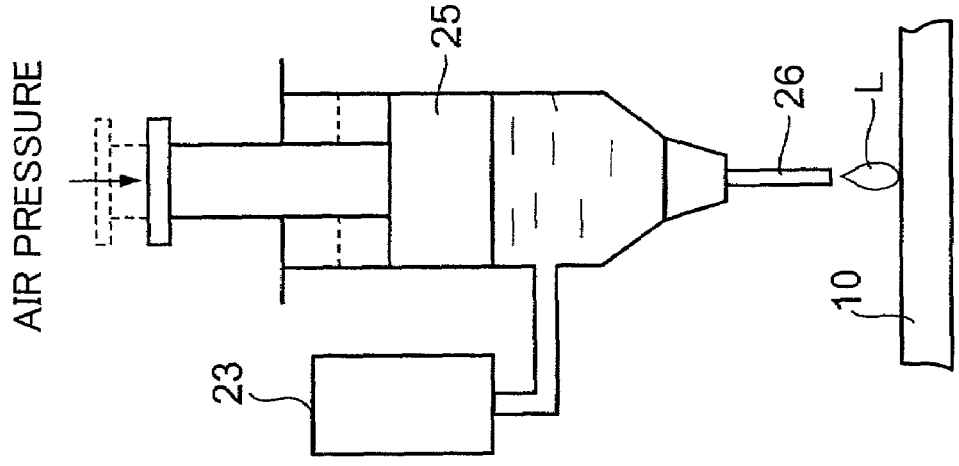
FIGS. 7A to 7C are a view showing a step of dropping the liquid crystal by the syringe employed to manufacture the liquid crystal display device according to the second embodiment of the present invention respectively.
Figure 7B:
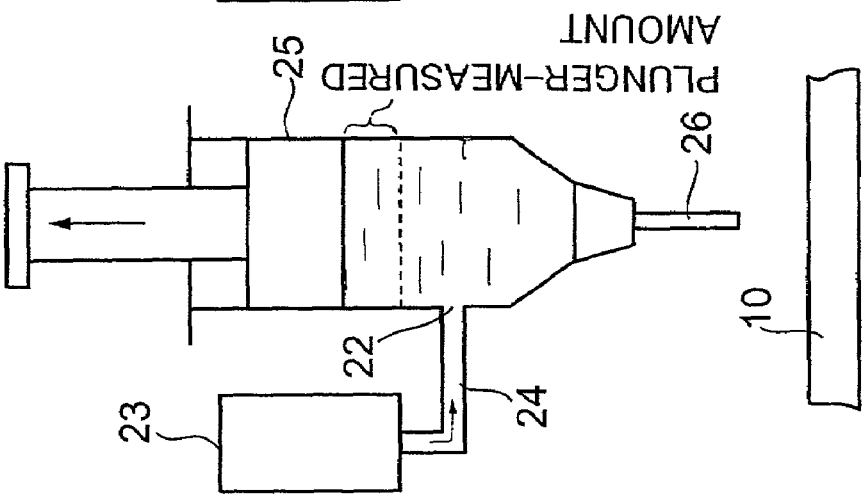
Figure 7C:
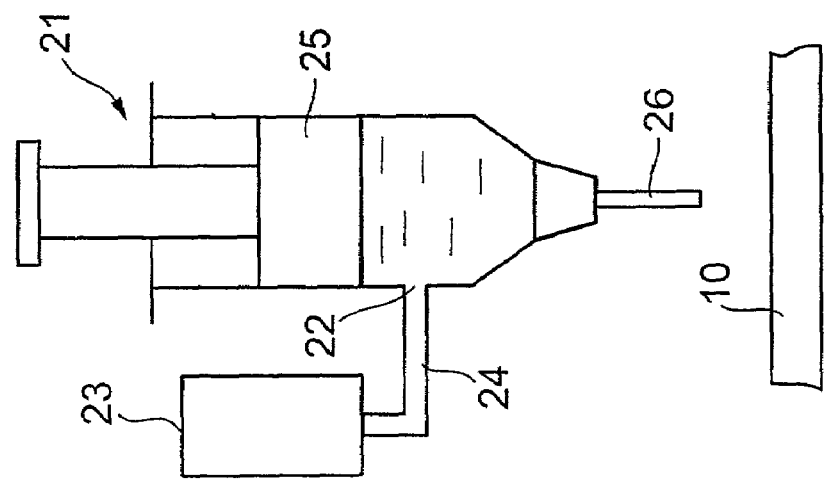

FIGS. 7A to 7C show the air system syringe different from that in FIG. 6.

In a syringe 21 shown in FIGS. 7A to 7C, a liquid crystal introducing port 22 is formed on its side surface, and a liquid crystal replenishing source 23 is connected to the liquid crystal introducing port 22 via a liquid crystal introducing pipe 24. As the liquid crystal replenishing source 23, a high precision dropping system dispenser such as the plunger system syringe, for example, is employed. Also, a piston, which is pushed downward by the air pressure, is inserted in the syringe 21, and a liquid crystal supply needle 26 is connected to the lower end of the syringe 21.

FIG. 7A shows the state that the supply of the liquid crystal L to one sheet of first substrate 10 is completed. In this state, the piston 25 is positioned at the position upper than the liquid crystal introducing port 22.

Then, as shown in FIG. 7B, the piston 25 in the syringe 21 is lifted up, and also the liquid crystal L is replenished from the liquid crystal replenishing source 23 into the syringe 21 via the liquid crystal introducing pipe 24 and the liquid crystal introducing port 22. In this case, an introducing speed of the liquid crystal L from the liquid crystal replenishing source 23 and a lifting speed of the piston 25 are adjusted such that the pressure in the syringe 21 is not changed. Also, an introduction amount of the liquid crystal L from the liquid crystal replenishing source 23 to the syringe 21 is made equal to a defined amount of the liquid crystal supplied every one sheet of substrate.

Then, as shown in FIG. 7C, the piston 25 is pushed down at a stroke by a defined amount by the air pressure to drop the liquid crystal from the liquid crystal supply needle 26 toward the first substrate 10 such that the liquid crystal does not adhered to the outer surface of the liquid crystal supply needle 26 and does not remain. After the liquid crystal is supplied to the first substrate 10, the state shown in FIG. 7A is brought about.

When such air system syringe is employed, for example, on the 15-inch panel, 48 locations and 48 shots are applied, and a total amount of the liquid crystal is 250 mg. Also, on the 23-inch panel, 128 shots are applied, and a total amount of the liquid crystal is 650 mg.

As described above, because the operations in FIGS. 7A to 8C are repeated, the same liquid amount can always be filled in the syringe 22 under the piston 25 every time when the liquid crystal L is supplied to the first substrate 10. Therefore, the error from the target value of the supply amount of the liquid crystal L can be reduced, and thus the high precision constant amount projection of the liquid crystal can be achieved.

Then, the first substrate 10 and the second substrate 12 are stuck together, but explanation of the step will be omitted because the step is identical to the first embodiment. In this case, the plunger system syringe shown in FIG. 2 may be employed as the syringe shown in FIG. 7.

In above two embodiments, the sealing member 11 is coated on the first substrate 10, and then the liquid crystal is supplied thereto. In contrast, the sealing member 11 may be coated on the second substrate 12, and then the liquid crystal may be supplied thereto.

As described above, according to the present invention, the liquid crystal is supplied from the liquid crystal supply needle to the substrate, and then the liquid crystal adhered to the surface of the liquid crystal supply needle is caused to drop down by the force applied from the outside. Therefore, the liquid crystal can be supplied onto the substrate by a high precision amount.

Also, the pushing force of the liquid crystal onto the liquid crystal supply needle can be made constant by replenishing the liquid crystal from the outside into the syringe by the same amount as the amount dropped from the syringe, and also the liquid crystal can be dropped at a stroke from the liquid crystal supply needle at the speed such that the liquid crystal does not remain on the surface of the liquid crystal supply needle in the syringe. Therefore, the liquid crystal is not left on the surface of the liquid crystal supply needle and also the dropping of the liquid crystal is started in the syringe under the same conditions. As a result, the variation on the dropping conditions of the liquid crystal can be suppressed.

With the above, the error in the amount of the liquid crystal in the liquid crystal display device can be reduced rather than the prior art, and also the defective display of the liquid crystal display device can be reduced.

What is claimed is:

1. A liquid crystal display device manufacturing method comprising the steps of:
   forming a sealing member along a periphery of a display area on a first surface of a first substrate;
   dropping a liquid crystal to the first surface of the first substrate from a liquid crystal supply needle provided to a syringe in which the liquid crystal is filled; and
   causing a portion of the liquid crystal that has adhered to a surface of the liquid crystal supply needle to fall onto the first substrate by blowing a gas against the liquid crystal supply needle after said dropping the liquid crystal step.

2. A liquid crystal display device manufacturing method according to claim 1, wherein the gas is blown against the liquid crystal supply needle from air supply needles that are arranged around the liquid crystal supply needle.

3. A liquid crystal display device manufacturing method according to claim 1, wherein the liquid crystal in the syringe is pushed out of the liquid crystal supply needle by a mechanically actuated plunger.

* * * * *